(12) United States Patent
DeFino (10) Patent No.: US 10,525,507 B2
(45) Date of Patent: Jan. 7, 2020

(54) SYSTEM FOR RECYCLING ASPHALT MILLINGS AND METHODS THEREOF

(71) Applicant: Hector DeFino, Parlin, NJ (US)

(72) Inventor: Hector DeFino, Parlin, NJ (US)

( * ) Notice: Subject to any disclaimer, the term of this patent is extended or adjusted under 35 U.S.C. 154(b) by 0 days.

(21) Appl. No.: 14/031,027

(22) Filed: Sep. 18, 2013

(65) Prior Publication Data
US 2014/0083912 A1 Mar. 27, 2014

Related U.S. Application Data

(60) Provisional application No. 61/702,524, filed on Sep. 18, 2012.

(51) Int. Cl.
*B07B 1/00* (2006.01)
*B09B 3/00* (2006.01)

(52) U.S. Cl.
CPC ............... *B07B 1/00* (2013.01); *B09B 3/00* (2013.01); *B09B 3/0083* (2013.01); *C08L 2555/34* (2013.01)

(58) Field of Classification Search
CPC .... B07B 1/00; B07B 1/62; B07B 1/22; B07B 1/24; B07B 13/00; B07B 13/02; B07B 13/07; B09B 3/00; B09B 3/0083; C08L 2555/34
USPC .......... 209/3.1, 11, 235, 238, 621, 664, 324, 209/369, 913, 931; 366/7; 241/3, 23
See application file for complete search history.

(56) References Cited

U.S. PATENT DOCUMENTS

| | | | | |
|---|---|---|---|---|
| 3,607,999 A | * | 9/1971 | Corbett | B29B 17/0036 264/126 |
| 3,883,624 A | * | 5/1975 | McKenzie | B29B 17/0005 264/126 |
| 5,300,137 A | * | 4/1994 | Weyand | B09B 3/00 266/148 |
| 2009/0039184 A1 | * | 2/2009 | Vanderpool | B09B 3/00 241/3 |

* cited by examiner

*Primary Examiner* — Charles A Fox
*Assistant Examiner* — Kalyanavenkateshware Kumar
(74) *Attorney, Agent, or Firm* — Lawrence B. Goodwin PLLC (57) ABSTRACT

A system for recycling asphalt millings and methods thereof are provided. In exemplary embodiments, an apparatus for recycling asphalt millings may comprise a blender comprising a basin having an interior volume, an agitator disposed within the interior volume, the agitator adapted to agitate asphalt millings, a blender grate disposed on the bottom of the basin, the blender grate comprising apertures adapted to allow bitumen to pass through the blender grate, a heating conveyor comprising a heating apparatus for heating the asphalt millings, a cooling conveyor comprising an input for receiving asphalt millings and an opening adapted to receive a cold material applicator, a cold material applicator disposed in the opening, the cold material applicator adapted to apply cold material to asphalt millings.

2 Claims, 10 Drawing Sheets

FIG. 9

SYSTEM FOR RECYCLING ASPHALT MILLINGS AND METHODS THEREOF

CROSS-REFERENCE TO RELATED APPLICATIONS

The present application claims priority to U.S. Provisional Patent Application Ser. No. 61/702,524 entitled "System for Recycling Asphalt Millings and Methods Thereof," filed Sep. 18, 2012, the disclosure of which is incorporated herein by reference in its entirety.

BACKGROUND

Field of the Invention

Embodiments of the present invention are generally related to a system for recycling asphalt millings and methods thereof. More specifically, embodiments of the present invention relate to a system for removing bitumen from the stone found in asphalt millings so that the stone may be recycled and/or reused for future applications.

Description of Related Art

Bituminous concrete, otherwise and more commonly known as asphalt millings, are a common environmental concern during any road construction or similar asphalt construction project. The problem with asphalt millings is that the bitumen binder used in asphalt paving applications contains a relatively large concentration of a family of carcinogenic compounds which can pose serious human health and environmental concerns in certain circumstances such as when asphalt material is ground into very small particles that easily blow off of or wash from the surface.

These compounds, known as polycyclic aromatic hydrocarbons (PAHs) are specified as targeted pollutants by the U.S. Environmental Protection Agency (USEPA), and are present in asphalt at much higher levels than the criteria established by most states for general use in a loose fashion on land. Asphalt millings used alone without a paved top surface have the potential to significantly migrate from the roadway through the actions of water, wind, and physical displacement and possibly contaminate surrounding soils and/or surface water sediments. Traffic traveling on the unpaved asphalt millings would generate dust containing the compounds referenced above and the dust would be a major migration route of the millings to the surrounding environment.

Several uses in of asphalt millings are fully appropriate in accordance with many state's regulations for recycling and beneficial use. However, the use of loose unbound asphalt millings on land and roadway surfaces without the placement of a paved top surface is not generally appropriate; and millings should not be used where runoff to surface water features would be possible in order to prevent sediment contamination. As such, asphalt millings are not considered clean fill.

Many states permit millings may be taken directly to and used by road asphalt manufacturing plants for direct incorporation into asphalt (bituminous concrete), pursuant to recycling exemption for such use which limits the amount of millings per new asphalt that can be used, which can often be 20% or less. As such, for every ton of asphalt millings, there needs to be at least five tons of new asphalt in which to incorporate the millings. Viewed from a different perspective, at least 80% of asphalt bitumen is effectively wasted from reuse due to state environmental restrictions.

As such, there is a need for a system for recycling asphalt millings and methods thereof.

SUMMARY

Embodiments of the present invention are generally related to a system for recycling asphalt millings and methods thereof. In one embodiment, an apparatus for recycling asphalt millings is provided that may comprise a blender comprising a basin having an interior volume; an agitator disposed within the interior volume, the agitator adapted to agitate asphalt millings; a blender grate disposed on the bottom of the basin, the blender grate comprising apertures adapted to allow bitumen to pass through the blender grate; a heating conveyor comprising a heating apparatus for heating the asphalt millings; a cooling conveyor comprising an input for receiving asphalt millings and an opening adapted to receive a cold material applicator; a cold material applicator disposed in the opening, the cold material applicator adapted to apply cold material to asphalt millings.

In another embodiment of the present disclosure, an apparatus for recycling asphalt millings is provided that may comprise a ribbon blender comprising a basin having an interior volume; an agitator disposed within the interior volume, the agitator adapted to agitate asphalt millings; a blender grate disposed on the bottom of the basin, the blender grate comprising apertures adapted to allow bitumen to pass through the grate; a paddle conveyor comprising a heating apparatus for heating the asphalt millings; a screw conveyor comprising an input for receiving asphalt millings and an opening adapted to receive a jet; and a jet disposed in the opening, the jet adapted to apply cold material to asphalt millings.

In yet another embodiment of the present disclosure, method for recycling asphalt millings is provide that may comprise: providing an apparatus for recycling asphalt millings that may comprise a blender comprising an agitator; a heating conveyor comprising a heating apparatus; and a cooling conveyor comprising a cold material applicator; adding the asphalt millings to the blender; agitating the asphalt millings with the agitator and producing initially cleaned millings; adding the initially cleaned millings to the heating conveyor and heating the initially cleaned millings to produce heated millings; adding the heated millings to the cooling conveyor; applying a cold material to the heated millings via the cold material applicator to produce substantially clean stone.

BRIEF DESCRIPTION OF THE DRAWINGS

So the manner in which the above-recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention are generally related to a system for recycling asphalt millings and methods thereof. More specifically, embodiments of the present invention relate to a system for removing bitumen from the stone found in asphalt millings so that the stone may be recycled and/or reused for future applications.

Figure 1:
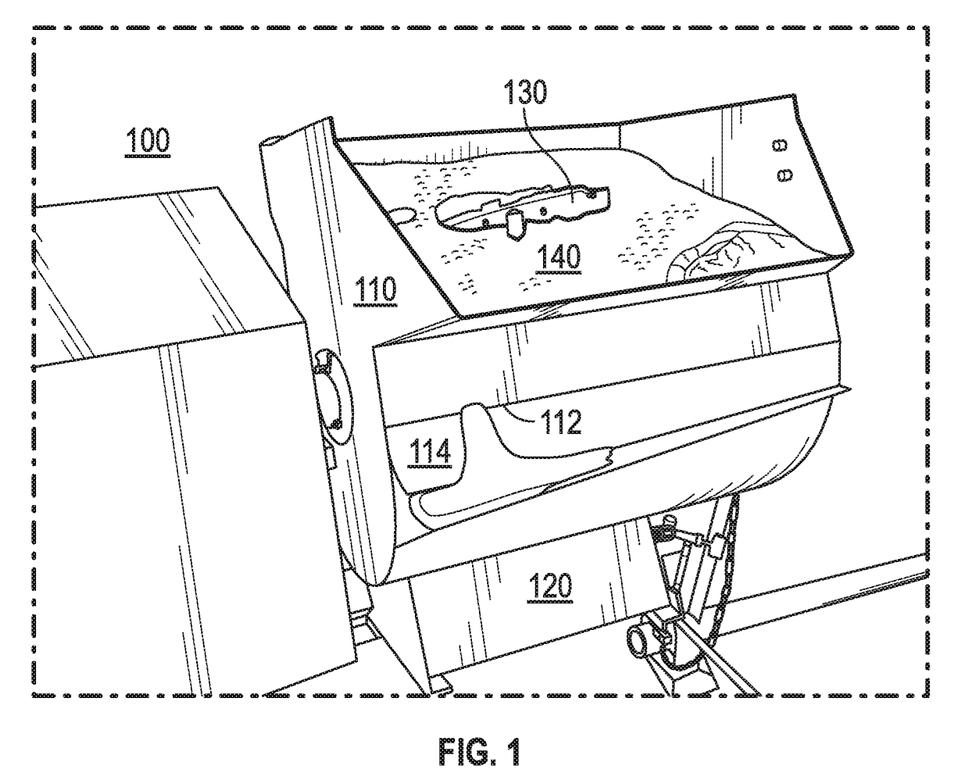
FIG. 1 depicts a photograph an exemplary apparatus for recycling asphalt millings in accordance with one embodiment of the present invention.

FIG. 1 depicts a photograph an exemplary apparatus 100 for recycling asphalt millings in accordance with one embodiment of the present invention. As shown in the figure the apparatus 100 generally comprises a churning drum 110 having an interior volume, a burner assembly 120 for heating the drum 110 and the contents therein, and a plurality of brushes or paddles 130 for churning the contents of the drum 110. The drum 110 may comprise any size or shape voluminous body suitable for embodiments of the present invention as described herein. In various embodiments, the drum 110 may be as small as a few cubic feet to as large as thousands of cubic feet in size.

The burner assembly 120 may comprise any type of burner suitable to heat the drum and the contents therein, as described herein below. In many embodiments, the burner assembly 120 comprises a propane burner, connected to a source of fuel (not shown), and capable of maintain a constant flame over a substantial period of time. In further embodiments, electric burners, natural gas burners, or the like may be utilized.

The plurality of brushes or paddles 130 may comprise any number of devices necessary to adequately churn the contents of the drum during use. In one embodiment, the plurality of brushes or paddles 130 comprises a set of angled brushes positioned on arms extending from a central shaft. As the central shaft rotates, the brushes also rotate, churning the contents of the drum. In another embodiment, paddles may be similarly positioned such that as a central shaft rotates, the paddles lift and move any of the contents within the drum. As a number of solutions may exist, and may be generally known, for providing a set of brushes, paddles, fins, or the like, to churn contents within a voluminous body, any of such solutions may be suitable for various embodiments of the present invention.

In certain embodiments, the drum 110 may comprise an outlet 112 for permitting the bitumen to exit the drum 110. As shown in the Figure, in one embodiment, the outlet 112 may comprise a slit or slot down a side of the drum. In the embodiment depicted, the outlet 112 may be coupled with a channel or fin 114 for directing the exiting bitumen towards a waste collection area (not shown). In alternative embodiments, the outlet 112 may comprise a filtered outlet system comprising pipes directing exiting bitumen/water to further be filtered through any number of filtering processes (e.g., a water vapor filtration system to separate any water from the bitumen residue).

In further embodiments of the present invention, the apparatus 100 may comprise a means for stone removal after the bitumen has been separated. In one embodiment, such means for stone removal may comprise paddles (as described above), which may lift the stone in the normal course, and upon positioning of a chute or similar structural device, the stone may be removed from the drum 110. Alternatively, the means for stone removal may comprise a separate outlet on the drum 110, which may permit a user to open the outlet after the bitumen has been removed, and the stone and liquid may be further separate through any number of filtration processes.

In accordance with many embodiments of the present invention, the apparatus 100 must generally operate in connection with a liquid mixture in order to cleanse and recycle the asphalt millings. The liquid mixture, generally shown as liquid 140, comprises a combination of water, oil (such as mineral oil, peanut oil, vegetable oil, or the like), and a chemical composition, such composition generally comprising a mixture of water, sodium lauryl sulfate, sodium laureth sulfate, lauramine oxide, alcohol denatured, sodium chloride, copolymers, phenoxyethanol, magnesium chloride, methylisothiazolinone and triclosan. In many embodiments, the chemical composition added to the liquid mixture may be obtained commercially as a form of dish soap.

Generally, the amount of liquid mixture provided is dependent upon the amount of asphalt millings needed to be cleansed or recycled. For example, in one embodiment, for every nine cubic feet of asphalt millings, the liquid mixture may comprise approximately seven to ten gallons of water, approximately 3 to 5 ounces of oil, and approximately 3 to 5 ounces of chemical composition. It should be appreciated, however, variations of the ratios of ingredients herein may be modified substantially (e.g., 500% or more) without departing from the scope of embodiments of the present invention.

Figure 2:
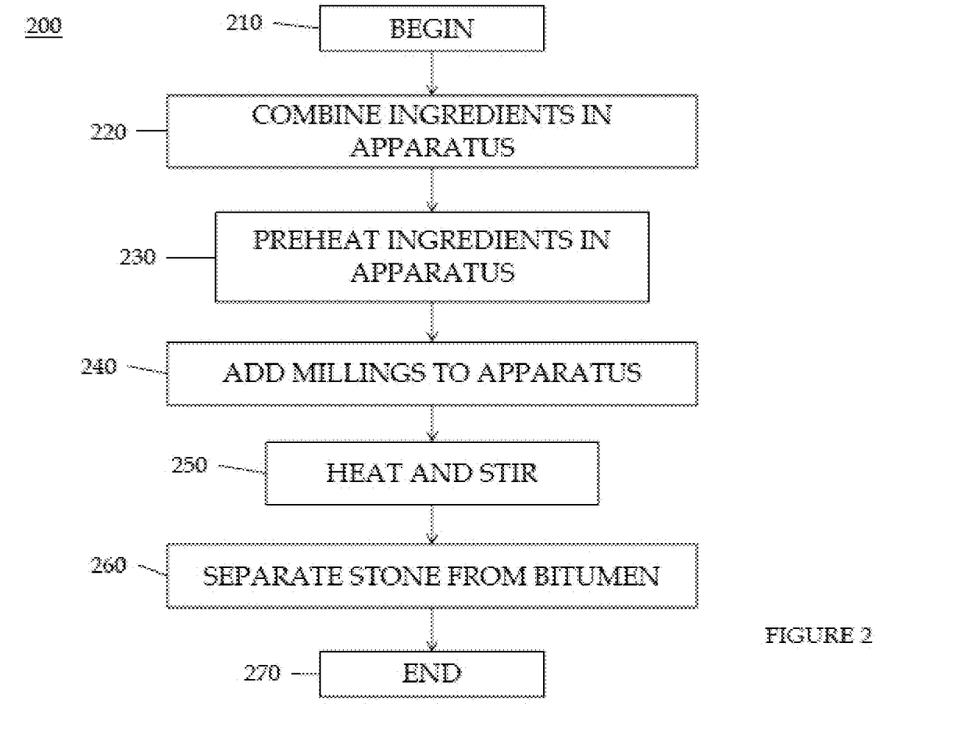
FIG. 2 depicts a flowchart of a method of recycling asphalt millings in accordance with one embodiment of the present invention.

FIG. 2 depicts a flowchart of a method of recycling asphalt millings in accordance with one embodiment of the present invention. The method 200 begins at step 210 where an apparatus, such as the apparatus described in FIG. 1 is provided.

At step 220, the liquid mixture ingredients are added to the drum of the apparatus. In exemplary embodiments, seven to ten gallons of water, approximately 3 to 5 ounces of oil, and approximately 3 to 5 ounces of chemical composition are added to the drum. It should be appreciated, however, the quantities provided herein should not be deemed limiting in any capacity to the scope and future embodiments of the present invention, and are merely indicative of the exemplary and experimental embodiments conducted.

At step 230, the liquid mixture is preheated in the drum via the burner. In many embodiments, the liquid mixture is preheated to approximately between about 125 deg. F. to about 225 deg. F. In other embodiments, the liquid mixture is preheated to between about 140 deg. F. to about 160 deg. F. For many applications, it may be undesirable to heat the liquid mixture to a boiling temperature, as boiling may cause the water in the mixture to vaporize, thus changing the ratios of ingredients in the composition.

At step 240, asphalt millings are added to the apparatus. In one embodiment, given the amount of liquid mixture provided, about 9 cubic feet of asphalt millings may be added to the drum. However, in alternative embodiments, the amount of asphalt millings added may be dependent upon the size of the drum and its capabilities.

At step 250, the millings and liquid mixture composition are continuously heated and stirred/mixed within the drum. In many embodiments, the contents of the drum are heated to between about 135 deg. F. and about 225 deg. F. In one embodiment, the contents of the drum may be heated to between about 150 deg. F. to about 200 deg. F. The heating and stirring process at step 250 may continue for at least 30 minutes to as long as 48 hours. In the exemplary embodiment described herein, at the quantities shown, the heating and stirring process may take between about 45 minutes to 90 minutes.

At step 260, the stone of millings and the bitumen may begin to separate. As the stone and bitumen begin to separate, the stone remains at or near the bottom of the drum (given its weight) and the bitumen may generally float within the liquid mixture. As such, while the brushes or paddles are rotating, the bitumen will be pushed out the outlet of the drum. As soon as the bitumen has been removed, the stone may also be removed from the drum and permitted to dry. The method ends at step 270.

The resulting stone from the method 200 may generally be substantially free of any bitumen or undesirable oils. In many embodiments the stone may be at least 90% bitumen free. In further embodiments, the stone may be at least 98% bitumen free. In certain instances, it may be desirable to add a further cleansing/soaking process for the stone which may eliminate any residual bitumen thereon. As such, in at least one embodiment, the resulting stone from the processes described herein, may be at least 99.9% bitumen free.

Figure 3:
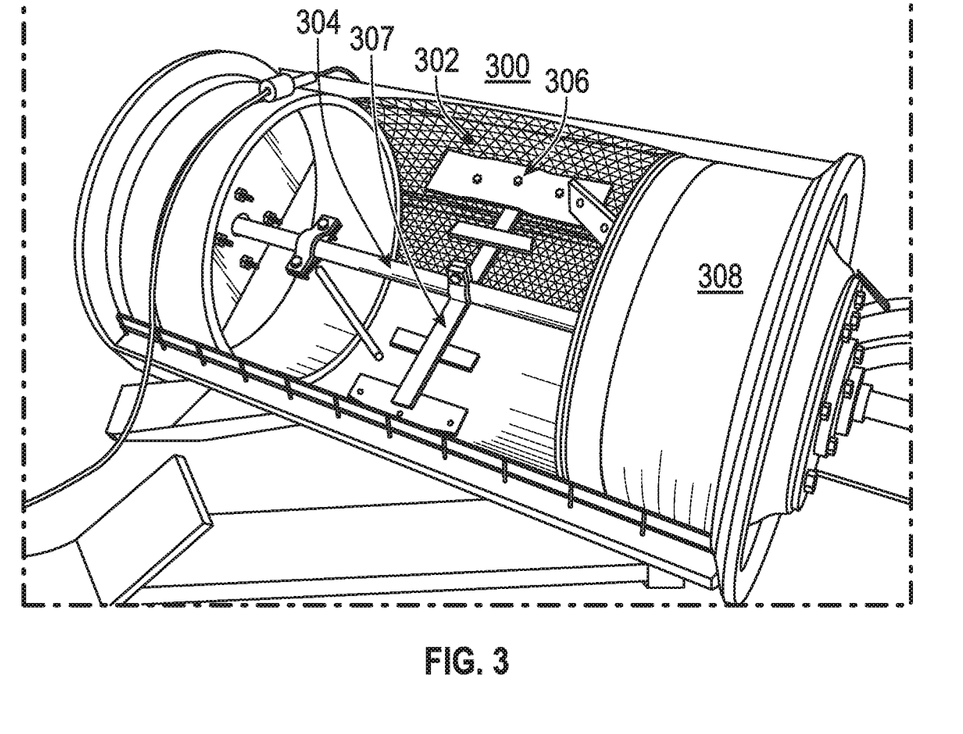
FIG. 3 depicts a photograph an exemplary apparatus for recycling asphalt millings in accordance with one embodiment of the present invention.

FIG. 3 depicts a photograph an exemplary apparatus 300 for recycling asphalt millings in accordance with one embodiment of the present invention. In exemplary embodiments, the apparatus 300 comprises a screen drum 308. The screen drum 308 may be adapted to separate materials by size, for example, separating different sizes of crushed stone or separating liquid, sand, glass, bitumen, and/or the like from stone. In some embodiments, the screen drum 308 may comprise a trommel, or the like. The screen drum 308 may comprise a screened cylinder adapted to separate stone in asphalt millings from another material when rotated.

The screen drum 308 may generally comprise a shaft 304, one or more screen paddles 306 and a screen grate 302, and/or the like. The shaft 304 may run through the center of an interior cavity of the screen drum 308. In some embodiments the shaft 304 may run through a location closer to the sides of the drum 308 and/or may simply be connected with to an exterior surface of the drum 308 and adapted to rotate the drum when moved by another mechanical or electrical force. In some embodiments, more than one drum 308 may be included in the apparatus 300. In some embodiments, more than one shaft 304 may be included. The drum 308 may generally comprise a diameter of between 18 inches and 68 inches, but may also comprise much larger drum, for example, 20 feet in diameter, or the like. In various embodiments, the drum 308 may be as small as a few cubic feet to as large as thousands of cubic feet in size.

The screen paddle 306 may be adapted to move, churn, and/or sift through material within the interior of the drum 308. By way of example the screen paddle 306 may be adapted to move liquid, asphalt millings, bitumen, and/or the like so that it does not stay stagnant within the drum 308 and stick or attach to an interior surface of the drum 308. In some embodiments, the screen paddle 306 may be attached to the shaft 304 in an interior cavity of the drum 308. In some embodiments, more than one screen paddle 306 may be included in the drum 308. The screen paddle 306 may be attached to a paddle connector 307 that may comprise a flat and/or rounded connector that connects the paddle 306 to the shaft 304 and/or the like. In some embodiments, the paddle connector 307 may be extend from the paddle 306 on one side of the interior cavity of the drum 308 all the way to an opposite side of the interior cavity of the drum 308. In some embodiments, the connector 307 may extend less than the entire distance between two sides of the drum 308 and/or may terminate at the shaft 304. Although pictured as a rectangle, the paddle 306 may comprise any feasible shape adapted to move materials around on the interior of the drum 308. In some embodiments, more than one paddle 306 and/or more than one paddle connector 307 may be included. In some embodiments, the paddle 306 may be attached directly to the shaft 304 and/or directly to an interior surface of the drum 308. The drum 308 may be included in any process described herein, including the method described above with respect to FIG. 2. For example, the drum 308 may be included before and/or after the millings are added to the churning drum 110.

The screen grate 302, may comprise holes and/or apertures adapted to separate larger materials from smaller materials that come into contact with the grate 302. For example, the grate 302 may comprise holes and/or apertures of a sufficient size to allow a liquid, bitumen, sand, glass, or smaller materials to pass through the grate 302, while retaining larger items, for example, pieces of asphalt millings. The grate 302 may be positioned on one side of the drum 308 or may comprise the entire outside surface of the side of the drum 308. In some embodiments, the grate 302 may be closeable with an exterior closing means and/or door (not shown). The closing means may be adapted to cover the grate 302 and prevent any material from exiting the drum 308, thereby allowing the materials inside the drum 308 to mix when the drum 308 is rotated with the shaft 304 and/or the like. The grate 302 may comprise steel or a material of sufficient strength to resist bending, deforming, and or breaking when contacted with stones and/or asphalt millings that fill a substantial portion of the interior of the drum 308. In some embodiments, a screw conveyor (not shown) may be included to transport the millings and/or bitumen to and/or from the drum 308 to another component of the apparatus 300. In some embodiments, a heating member (not shown), such as a burner assembly, may be disposed adjacent to, near, or underneath the screen drum 308 to heat up the bitumen, asphalt millings, and/or other liquids present inside the drum 308 before transporting the material to a separate portion of the apparatus 300.

Figure 4A:
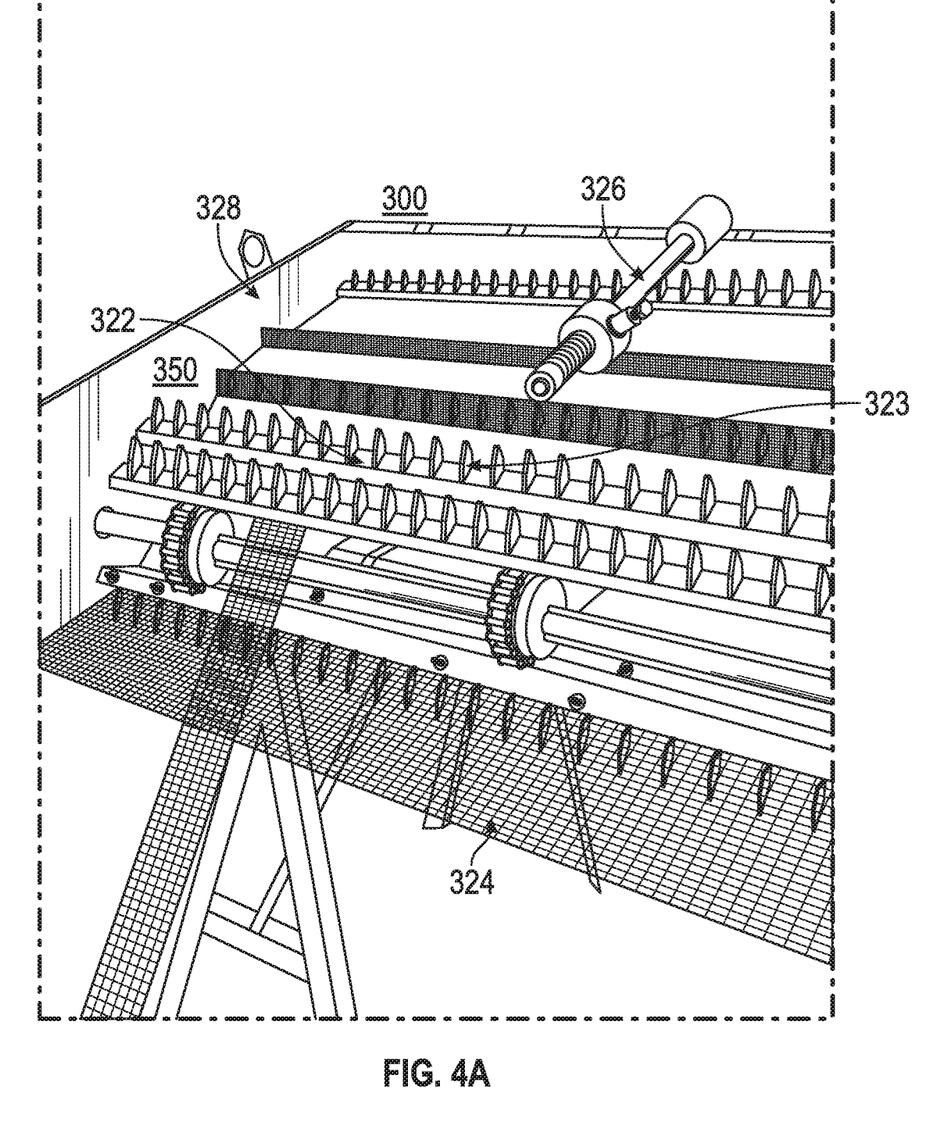
FIG. 4A depicts a photograph an exemplary apparatus for recycling asphalt millings in accordance with one embodiment of the present invention.
Figure 4B:
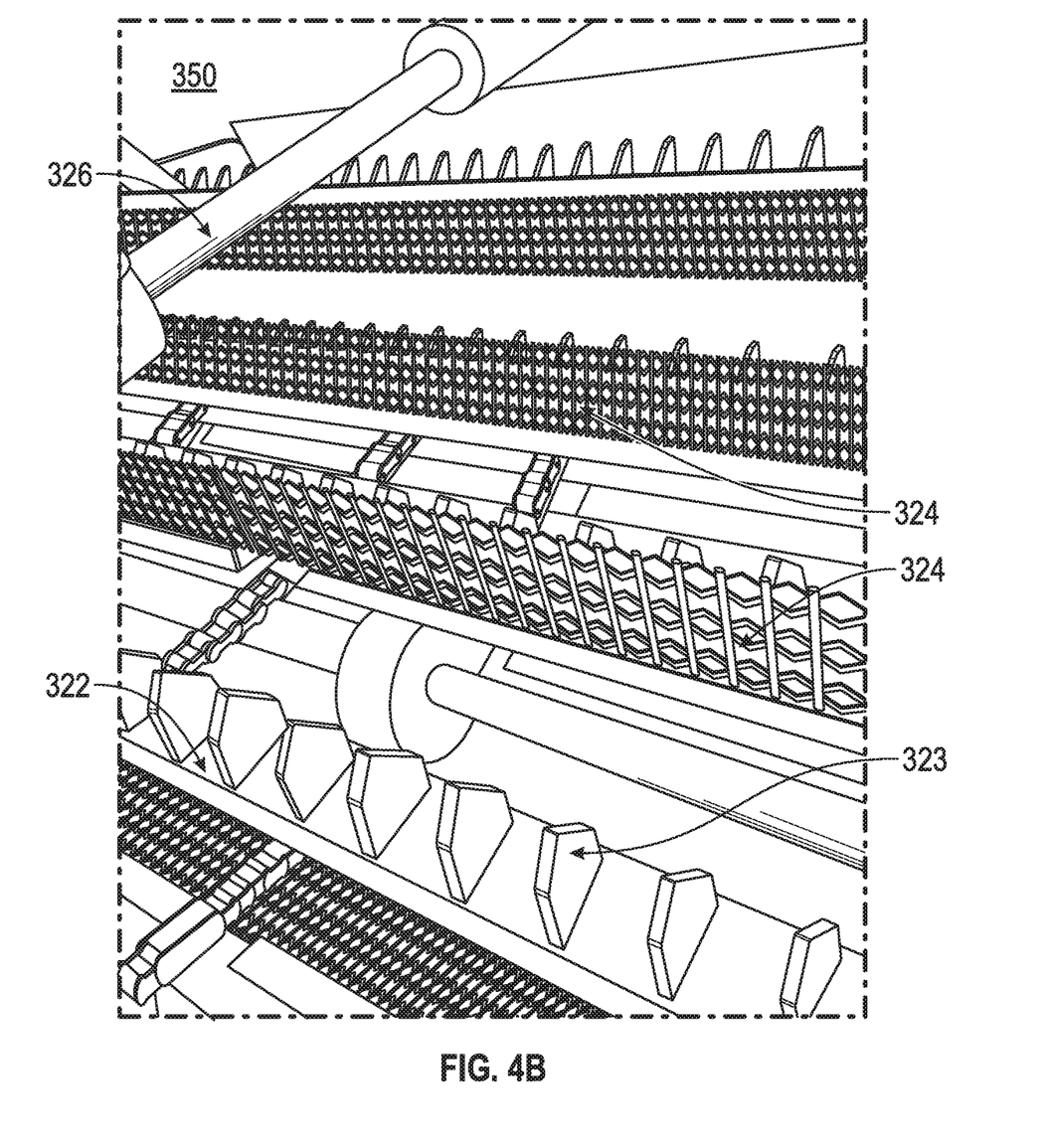
FIG. 4B depicts a photograph an exemplary apparatus for recycling asphalt millings in accordance with one embodiment of the present invention.

FIGS. 4A and 4B depict a photograph an exemplary apparatus 300 for recycling asphalt millings in accordance with one embodiment of the present invention. In exemplary embodiments, the apparatus may comprise a conveyor 350. A conveyor 350 may comprise a conveyor paddle 322, teeth 323, a conveyor screen 324, a conveyor shaft 326, a side wall 328, and/or the like. In exemplary embodiments, the conveyor 350 may be adapted to move materials, such as asphalt millings and bitumen along a path. In some embodiments, the path may comprise an incline between 1 and 90 degrees.

In accordance with exemplary embodiments, the conveyor 350 may transport smaller portions of asphalt millings and bitumen along the conveyor in a relatively spread out configuration, so that each paddle 322 may carry a portion of asphalt millings and/or bitumen received from either the churning drum 110, the screen drum 308, and/or the like. In exemplary embodiments, the conveyor 350 may be adapted to receive the asphalt millings, bitumen, and/or the like after it has been heated. For example, the asphalt millings, bitumen, and/or the like may be heated in the churning drum 110 and/or the screen drum 308 prior to being transported to the conveyor 350.

In some embodiments, the conveyor 350 may comprise a means for disbursing liquid nitrogen, dry ice, and/or the like (not shown). In exemplary embodiments, the apparatus 300 may comprise jets (not shown) or a disbursement means adapted to spray or otherwise apply liquid nitrogen, dry ice, and/or the like to heated asphalt millings, bitumen, and/or the like that is being transported on the conveyor 350. In some embodiments, the jets or other disbursement means may be configured to apply liquid nitrogen, dry ice, and/or the like at a sufficient force such that bitumen and is separated from stone of asphalt millings when it is applied.

In some embodiments, the temperature differential between the heated asphalt millings and bitumen and the applied liquid nitrogen, dry ice, and/or the like, may cause the bitumen to separate from the stone of the asphalt millings. When the bitumen is separated from the stone of the asphalt millings, it may be filtered through the conveyor screen 324 to a collection means (not shown), such as a tank, a channel, an outlet, and/or the like. The remaining stone of the asphalt millings may continue to be transported by the conveyor paddles 322 and placed in a second collection means, such as a tank, a box bed of a dump truck, a freight car, a storage means, a transportation means, and/or the like. In some embodiments, the liquid nitrogen, dry ice, and/or the like may be blasted onto the asphalt millings by the jets. In some embodiments, the materials, such as asphalt millings, stone, and bitumen, may be blasted with abrasives by the apparatus 300. The apparatus 300 may be adapted to forcibly propelling a stream of abrasive material against the surface of the materials under high pressure to extract the bitumen from the asphalt millings.

In exemplary embodiments, a conveyor paddle 322 may be coupled with a conveyor track, and may be adapted to transport materials, such as asphalt millings and/or bitumen along the conveyor track. The conveyor paddle 322 may be coupled with one or more teeth 323, a conveyor screen 324, a conveyor shaft 326, and/or the like. The conveyor paddle 322 may be adapted to be moved along the track by the track itself or by a conveyor shaft 326 that moves the paddle 322 along the track when the shaft 326 is rotated. The conveyor paddle 322 may be adapted to hold a predetermined amount of materials and transport the materials at an incline between 1 degree and 90 degrees, and/or the like. The conveyor paddle 322 may comprise a material of sufficient strength to substantially resist deforming, denting, and/or the like when transporting materials in excess of 500 pounds while being blasted with liquid nitrogen, dry ice, and/or the like. The conveyor paddle 322 may comprise one or more teeth 323, or the like. The apparatus 300 may be adapted to produce recycled asphalt with an approximately 95%-100% salvage rate.

In exemplary embodiments, the teeth 323 may comprise protrusions from the conveyor paddle 322 adapted to separate materials, such as stone of the asphalt millings and bitumen, into portions along the transverse length of the conveyor paddle 322, and/or the like. The teeth 323 may be disposed perpendicular to the paddle 322. The teeth 322 may comprise substantially flat members with substantially triangular heads adapted to push through materials, separate, and/or move materials up the conveyor 350. In some embodiments, the teeth 323 may comprise a degree of curvature to allow the teeth 323 to transport the material on the conveyor 350. The teeth may be evenly spaced across the transverse span of the paddle 322 or may be disposed in bunches. The teeth 323 may comprise material of sufficient strength to substantially resist breaking and/or bending when transporting heavy materials such as asphalt millings and when being blasted with liquid nitrogen, dry ice, and/or the like. The teeth may be integral with the paddle 322 or may be detachably attached for ease of cleaning.

In some embodiments, the conveyor 350 may comprise a conveyor screen 324. The conveyor screen 324 may be adapted to transport materials, such as asphalt and/or bitumen, along the track of the conveyor 350. The screen 324 may comprise holes and or apertures adapted to hold asphalt millings in place while allowing bitumen, liquids, sand, or the like, to pass through thereby separating the bitumen from the asphalt millings. The apparatus 300 may comprise a means of collecting the bitumen and the stone of the asphalt millings when they are separated. For example, the conveyor 350 may comprise a basin, tank, and/or the like for collecting both the stone of the asphalt millings and the bitumen separately. The apertures may be of sufficient size to allow bitumen to pass through while retaining asphalt millings on the screen 324. The screens 324 may be attached via a hinge, such that when the screens 324 pass a certain portion of the conveyor 350 they fold down and rotate underneath the conveyor track. In some embodiments, the screens 324 may then fold up to a substantially perpendicular position in relation to a paddle 322, for example, at the bottom of the track. In some embodiments, when the screens 324 may fold upwardly to transport materials up the track of the conveyor 350.

In some embodiments, the conveyor 350 may comprise conveyor shaft 326. The conveyor shaft 326 may be adapted to move the conveyor paddles 322 along the track of the conveyor 350. In some embodiments, the conveyor shaft 326 may be coupled with a track of the conveyor such that rotation of the conveyor shaft 326 causes the paddles 322 to move along the track. Although one conveyor shaft 326 is shown, more than one conveyor shaft 326 is contemplated by and within embodiments of the present disclosure. The conveyor shaft 326 may comprise a material adapted to pull the conveyor paddles 322 along the track of the conveyor 350 while the paddles 322 are transporting materials, such as asphalt millings and/or bitumen. In some embodiments, the conveyor 350 may comprise a side wall 328. The side wall 328 may be disposed on lateral sides of the conveyor 350 and may be adapted to retain materials, such as asphalt millings and/or bitumen, within the side walls.

Figure 5:
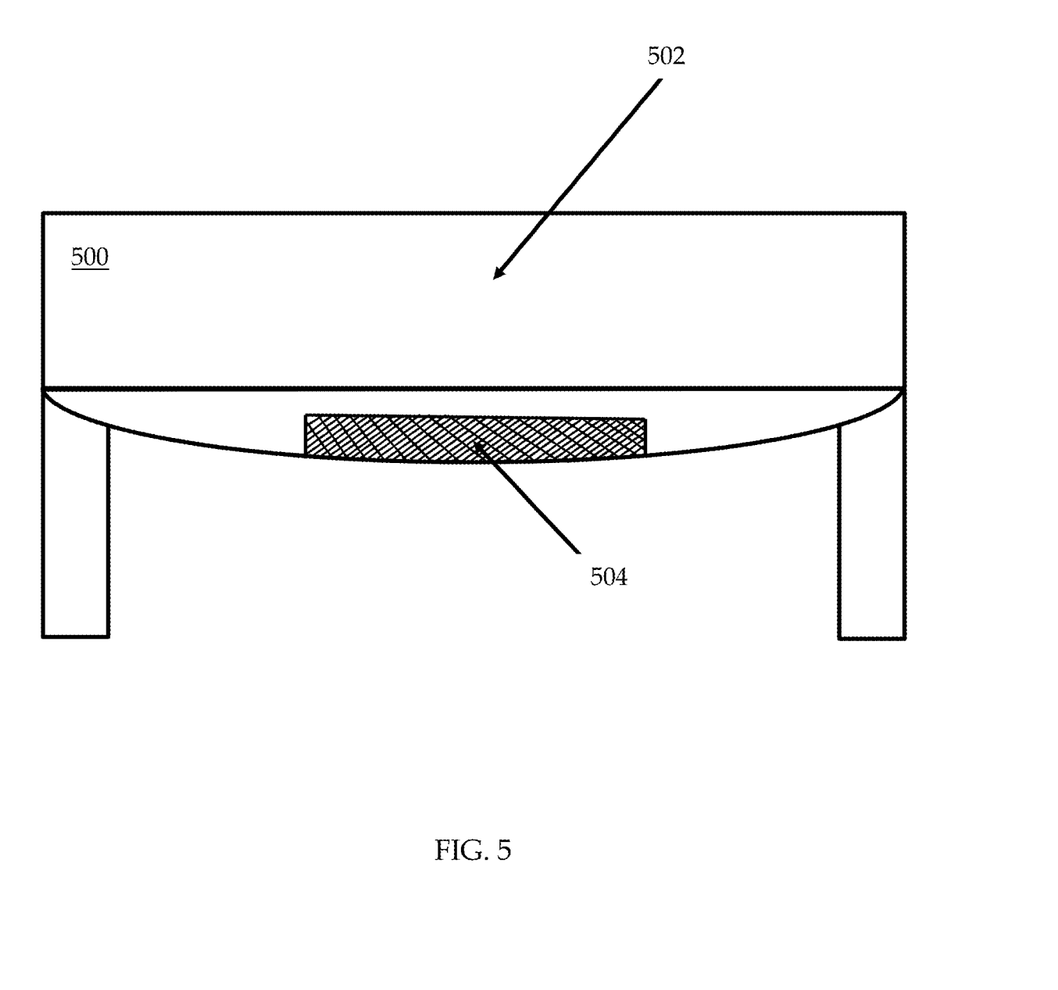
FIG. 5 depicts an exemplary blender for recycling asphalt millings in accordance with one embodiment of the present invention.
Figure 6:
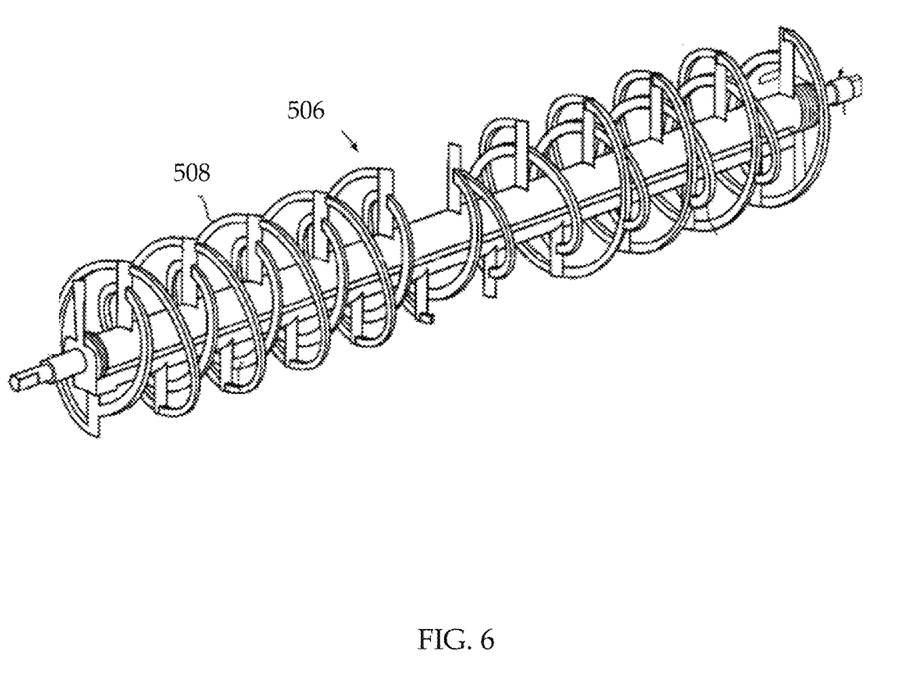
FIG. 6 depicts an exemplary agitator for recycling asphalt millings in accordance with one embodiment of the present invention.

FIG. 5 and FIG. 6 depict an exemplary blender 500 for recycling asphalt millings in accordance with one embodiment of the present invention. In some embodiments, the blender 500 may comprise a blender basin 502, a blender grate 504, an agitator 506, and helical blades 508, or the like. In exemplary embodiments, the blender 500 may be used in conjunction with any component in accordance with the present disclosure. The blender 500 may general be adapted to accept materials, such as asphalt millings or the like, and blend the materials in a blender basin 502. By way of example, the blender 500 may comprise a ribbon blender.

A blender basin 502 may comprise a U-shaped horizontal trough, or the like. The blender may comprise an agitator 506, such as the one depicted in FIG. 6. In some embodiments, the agitator 506 may comprise a ribbon agitator. In exemplary embodiments, the agitator 506 may comprise a set of inner and/or outer helical blades 508. The outer blades may be adapted to move the materials toward the center of the basin 502, and the blades may be adapted to move the materials toward the outside of the basin 502. In some embodiments, the agitator may be adapted to rotates at approx. 200-500 surface feet per minute (SFPM), or the like. In some embodiments, the blender 500 may be adapted to move materials both radially and laterally to insure substantially complete blends in relatively short cycle times. In exemplary embodiments, paddles, ore the like may be included instead of, or in addition to, the helical blades.

In operation, materials, such as asphalt millings, or the like, are placed in the blender 500 and blended in the blender basin 502 with the agitator 506. As the asphalt millings rub together, residue attached to the stones of the asphalt millings, such as bitumen, sand, glass, or the like, may be removed. As the bitumen is removed, it may pass downward over one or more blender grates 504 disposed at the bottom of the blender basin 502.

A blender grate 504 may generally comprise apertures adapted to allow residue like bitumen and sand to pass through the apertures, while retaining the stones that have been initially cleaned. The asphalt millings may be initially cleaned, and some materials removed and/or stripped from the stones, in the blender 500 during a blending process. After the blending process is complete, the remaining cleaned asphalt millings may be taken to another portion of an apparatus for recycling asphalt millings for further processing. For example, the remaining cleaned asphalt millings may be transported to a conveyor. In some embodiments, the blender basin 502 may be hingedly attached via a hinge and/or slidably attached to track and may be moved for emptying of the basin 502. For example, the basin 502 may be adapted to tip laterally to empty the contents of the basin 502. In another example, the basin 502 may be adapted to slide down a track or rails and empty via a side, the bottom, or the top of the basin 502. An exemplary conveyor is depicted in FIG. 7.

Figure 7:
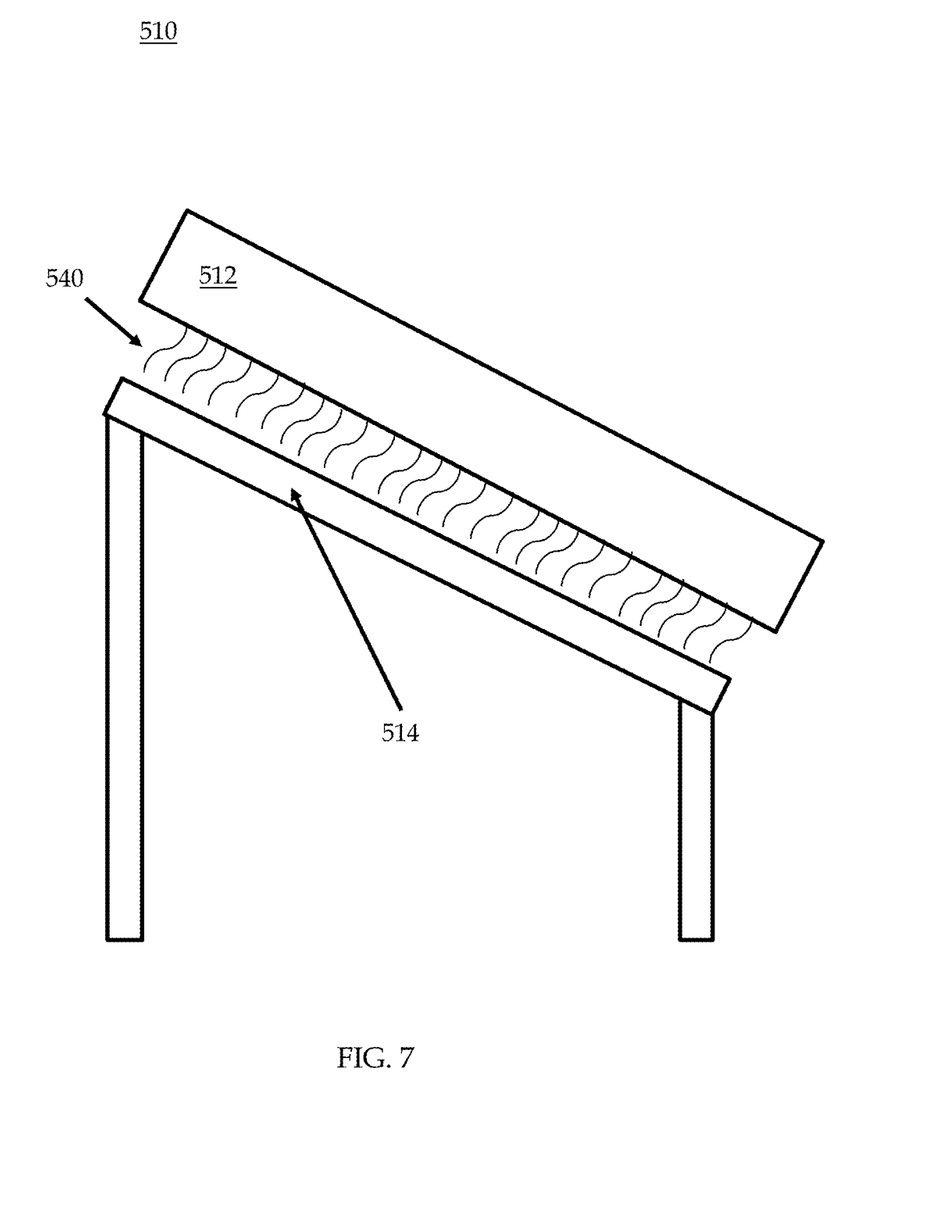
FIG. 7 depicts an exemplary apparatus for recycling asphalt millings in accordance with one embodiment of the present invention.

FIG. 7 depicts an exemplary heating conveyor 510 for recycling asphalt millings in accordance with one embodiment of the present invention. The conveyor may comprise a conveyor track 514 and a heating apparatus 512. In some embodiments, the heating conveyor 510, such as a grate conveyor and/or the conveyor 350 described above with respect to FIGS. 4A and 4B may be used. Alternative types of conveyors adapted to transport asphalt millings on a conveyor track may be used. In some embodiments, the conveyor track 514 may be flat or may be inclined, as shown in FIG. 7. The angle of incline of the conveyor track 514 may be from about 0 degrees to about 90 degrees. In some embodiments, a stationary surface may be used instead of a heating conveyor 510.

In exemplary embodiments, a material, for example, cleaned asphalt millings may be placed on the conveyor and transported along the conveyor track 514. When the materials are disposed on the conveyor track 514, the heating apparatus 512 may be activated and may heat the materials. In some embodiments, the heating element may be placed above, below, and/or adjacent the conveyor track 514. Although depicted as covering the entire length of the top of the conveyor track 514 in FIG. 7, the heating apparatus 512 may be disposed on only a portion of the track 514. In some embodiments, the heating conveyor 510 may comprise an open and/or screened bottom for allowing residue, such as bitumen and/or the like to escape through the bottom of the heating conveyor 510. In some embodiments, a collection basin and/or channel (not shown) may be disposed under the heating conveyor 510 for collection of the residue from the stones. For example, the heating apparatus 512 may be disposed at the top, at the bottom, in the middle, and/or the like of the track 514. In some embodiments, the heating apparatus may comprise the burner assembly described with respect to FIG. 1.

In exemplary embodiments, a heating apparatus 512 may comprise an electric and/or gas source of heat, adapted to apply heat 514 to materials, such as asphalt millings, or the like. In some embodiments, the heating apparatus 512 may be adapted to produce and direct infrared heat, or the like, on the materials carried or disposed on the heating conveyor 510. In exemplary embodiments, the heating apparatus 512 may generally be adapted to heat the materials, such as asphalt millings, to from about 180 degrees Fahrenheit to approximately 250 degrees Fahrenheit, or the like. In operation, after the materials, such as the asphalt millings, are heated on the heating conveyor 510 with the heating apparatus 512, the materials may be transported and disposed on a second conveyor, a cooling conveyor 520, and/or the like for a cooling process. In some embodiments, a single conveyor may be used for both the heating and cooling process.

Figure 8:
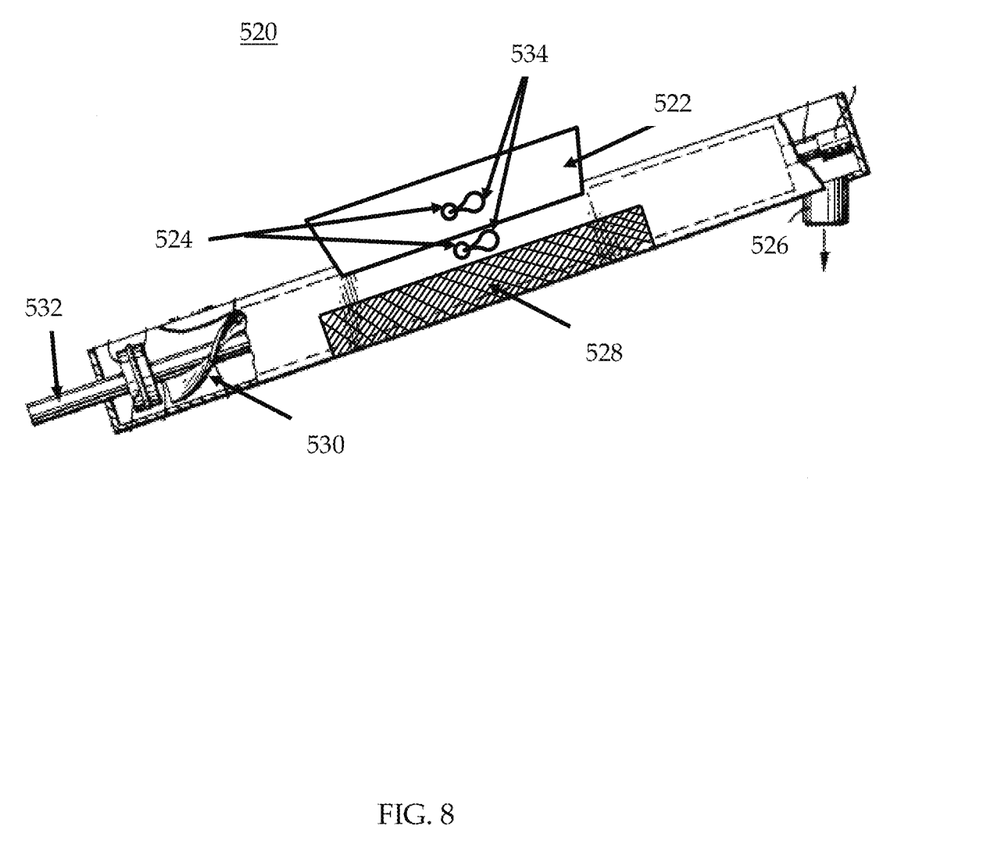
FIG. 8 depicts an exemplary apparatus for recycling asphalt millings in accordance with one embodiment of the present invention.

FIG. 8 depicts an exemplary cooling conveyor 520 for recycling asphalt millings in accordance with one embodiment of the present invention. In exemplary embodiments, a cooling conveyor 520 may comprise a screw conveyor. In some embodiments, the screw conveyor 520 may be adapted to transport raw materials, such as asphalt millings, or the like, through the screw conveyor 520 and apply a cold material to the raw materials. In some embodiments, the cold material may comprise a material of substantially low temperature, such as dry ice, liquid nitrogen, or the like. In exemplary embodiments, the screw conveyor 520 may comprise an input 522, an opening 524, an output 526, a conveyor grate 528, a screw 530, and a screw shaft 532. The screw 530 may be disposed in the center of the screw conveyor and may be adapted to move materials, such as asphalt millings, through the screw conveyor when the screw shaft 532 is rotated, for example via a mechanical and/or electrical power source. The input 522 may comprise an opening adapted to direct raw materials, such as asphalt millings, into a cavity of the screw conveyor 520. In exemplary embodiments, the input may receive the raw materials from any components in accordance with the present invention. In one example the raw materials may be fed into the input 522 via a hopper, or the like.

In exemplary embodiments, an opening 524 may be adapted to accept a cold material applicator 534. A cold material applicator 534 may comprise a jet, or the like. In some embodiments, an opening 524 may be adapted to accept a portion of a jet or the like. For example a jet head may couple with the aperture. Although depicted as being disposed on the input and on the side of the screw conveyor 520, any number and location of openings 524 are contemplated by and within embodiments of the present invention. In some embodiments, apertures may provide the jets access to spray, blast, and/or like the raw materials with the cold material. For example, dry ice may be blasted onto the raw materials inside the cavity of the screw conveyor 520. A conveyor grate 528 may comprise apertures adapted to allow residue, sediment, bitumen, sand, glass, and/or the like to filter through the grate while retaining the remaining cleaned stone. In operation, the heated materials, such as stone, bitumen, and asphalt millings may be fed into the input 522, and a cold material of substantially colder temperature than the heated materials may be blasted onto the heated materials. The screw conveyor 520 may comprise material adapted to resist damage during extreme changes in temperature, such as when the heated material is blasted with the cold material. For example, heated material may be heated by the heating apparatus 512 to a temperature of 250 degrees Fahrenheit and may be blasted with dry ice having a temperature of −109 degrees Fahrenheit, a temperature difference of approximately 359 degrees Fahrenheit. This extreme temperature difference removes residue, such as sand, oil, bitumen, and/or the like from the stone of the asphalt millings, producing a substantially clean stone. The substantially clean stone may then be transported, for example, by the screw conveyor 520 and exit the output 526. The residue, such as sand, oil, bitumen, and/or the like may generally be filtered and drop through the conveyor grate 528 to a storage location. In some embodiments, the output 526 may be disposed off the edge of the screw conveyor 520 instead of perpendicular to the conveyor 350, as depicted in FIG. 8. As such, the screw conveyor 520 may be adapted to receive heated asphalt millings and separate the stone from bitumen, or the like, by blasting or otherwise applying dry ice, or the like to the heated asphalt millings. The dry ice then may evaporate leaving little or no environmental waste. After the stone and bitumen, or the like are separated, each may be stored in separate storage locations (not shown). The process may be completed without utilizing the drums depicted in FIG. 1 and/or FIG. 3.

Figure 9:
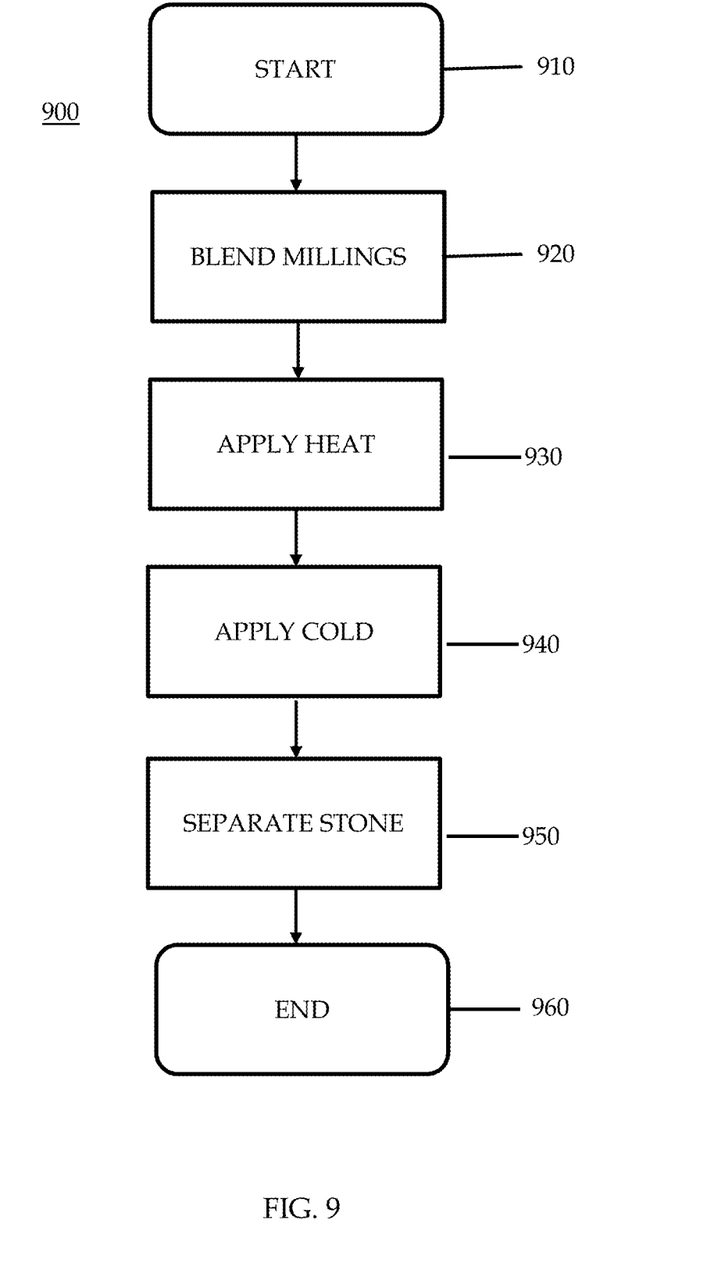
FIG. 9 depicts a flowchart of a method of recycling asphalt millings in accordance with one embodiment of the present invention.

FIG. 9 depicts a flowchart of a method 900 of recycling asphalt millings in accordance with one embodiment of the present invention. The method 900 begins at step 910 where an apparatus, such as the apparatus described herein with respect to FIGS. 1 and 3-8 is provided. For ease of illustration and exemplary purposes, the reference numbers of the embodiments described herein are used below. At step 920, asphalt millings may be added to the blender 500. The blender may be activated and operated at a sufficient speed to cause the stones of the asphalt millings to rub against each other and may remove residue, such as bitumen, oil, or the like, from the stone. The residue may be filtered through a blender grate 504 and separated from the initially cleaned millings. The initially cleaned millings may then be removed from the blender 500 and transported to a heating conveyor 510, or the like, for a heating process. In some embodiments, the millings may be placed directly on the heating conveyor 510 without being blended by the blender 500.

At step 930, the millings may be heated with a heating apparatus 512, or the like. In some embodiments, the millings may be heated from about approximately 130 deg. F. to about approximately 350 deg. F. In some embodiments, the millings are heated to between about 160 deg. F. to about 250 deg. F. The millings may be substantially continuously heated while on the heating conveyor 510 or at a single portion of the heating conveyor 510. The heating process at step 930 may continue for at least 10 seconds to as long as 48 hours. In the exemplary embodiment described herein, at the quantities shown, the heating process may take between about 45 minutes to 90 minutes. At the end of step 930, the stone of the millings and a portion of the bitumen may separate.

At step 940, the stone and the asphalt millings may be transported a conveyor. In some embodiments, a conveyor described with respect to FIGS. 4A, 4B, 7, 9, and/or the like may be used. In some embodiments, the conveyor may comprise a screw conveyor 520. The heated contents of one or more heating conveyor 510 or other containing apparatus may enter on or be collected by the conveyor 520 after the heating process has been completed. The conveyor 520 may further separate bitumen form the stone of the asphalt millings by pressure blasting or otherwise applying a colder material to the heated contents, the colder material having a substantially lower temperature than the heated contents. In some embodiments, the temperature difference between the heated contents and the colder material, and/or the applied pressure of the applied colder material being blasted, may cause the stone of the asphalt millings and the bitumen to separate. For example, dry ice and/or liquid nitrogen may be blasted, sprayed, or otherwise applied to the heated contents. In some embodiments, the colder material may be blasted at a force of between 60-200 PSI, for example, 125 PSI. The bitumen, or the like, may be separated from the stone and may filter through a conveyor grate 528 to be collected.

At step 950, the stone of millings and the bitumen may continue to separate and be placed into a container for collection. As the stone and bitumen separate, the stone may remain in the conveyor and the bitumen, or the like, may generally pass through the conveyor grate 528 to a containing member, such as a tank, a basin, a barrel, and/or the like. As such, while the heated contents are moving along the track of the screw conveyor 520, the bitumen will pass out of the conveyor through the conveyor grate 528. Once the bitumen has been removed, the stone may also be removed from the conveyor and permitted to dry. The method may end at step 960.

The resulting stone from the method 900 may generally be substantially free of any bitumen or undesirable oils. In many embodiments the stone may be at least 90% bitumen free. In further embodiments, the stone may be at least 98% bitumen free. In certain instances, it may be desirable to add a further cleansing/soaking process for the stone which may eliminate any residual bitumen thereon. As such, in at least one embodiment, the resulting stone from the processes described herein, may be at least 99.9% bitumen free.

While the foregoing is directed to embodiments of the present invention, other and further embodiments of the invention may be devised without departing from the basic scope thereof. It is also understood that various embodiments described herein may be utilized in combination with any other embodiment described, without departing from the scope contained herein.

What is claimed is:

1. An apparatus for recycling asphalt millings, the apparatus comprising:
 a ribbon blender comprising a basin having an interior volume;

an agitator disposed within the interior volume, the agitator adapted to agitate asphalt millings, the agitator comprising at least one of a helical blade and a paddle;

a blender grate disposed on the bottom of the basin, the blender grate comprising apertures adapted to allow bitumen to pass through the blender grate;

a heating conveyor comprising a heating apparatus for heating the asphalt millings, the heating apparatus comprising at least one of an infrared heater or a propane burner adapted to maintain a constant flame over a substantial period of time, the heating apparatus disposed above the conveyor;

a heating conveyor grate disposed at the bottom of the heating conveyor, the heating conveyor grate comprising apertures adapted to allow bitumen to pass through;

a cooling conveyor comprising an input for receiving asphalt millings and an opening adapted to receive a cold material applicator, the cooling conveyor comprising a screw conveyor, the cold material applicator comprising a jet adapted to blast the cold material from 100 psi to about 150 psi;

a cooling conveyor grate disposed at the bottom of the cooling conveyor, the cooling conveyor grate comprising apertures adapted to allow bitumen to pass through;

a cold material applicator disposed in the opening, the cold material applicator adapted to apply cold material to asphalt millings; and wherein the interior volume comprises from 500-1,000 cubic feet.

2. The apparatus of claim 1, wherein the cold material comprises at least one of dry ice and liquid nitrogen.

* * * * *